US010516462B2

(12) United States Patent
Wu et al.

(10) Patent No.: US 10,516,462 B2
(45) Date of Patent: Dec. 24, 2019

(54) PRECODING AND CHANNEL STATE INFORMATION ACQUISITION FOR MULTI-STREAM TRANSMISSIONS IN MASSIVE MIMO SYSTEMS

(71) Applicant: Huawei Technologies Co., Ltd., Shenzhen (CN)

(72) Inventors: Lu Wu, Shenzhen (CN); Wei Han, Shanghai (CN); Peng Shang, Shanghai (CN); Jin Liu, Shenzhen (CN); Xiaoyan Bi, Shanghai (CN); Shibin Ge, Shanghai (CN); Dageng Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/188,791

(22) Filed: Nov. 13, 2018

(65) Prior Publication Data

US 2019/0081682 A1 Mar. 14, 2019

Related U.S. Application Data

(63) Continuation of application No. PCT/IB2017/052863.

(Continued)

(51) Int. Cl.
*H04B 7/06* (2006.01)
*H04B 7/0456* (2017.01)
*H04L 5/00* (2006.01)

(52) U.S. Cl.
CPC ......... *H04B 7/0626* (2013.01); *H04B 7/0478* (2013.01); *H04B 7/0482* (2013.01);
(Continued)

(58) Field of Classification Search
CPC .. H04B 7/0626; H04B 7/0639; H04B 7/0456; H04B 7/0478; H04B 7/0417;
(Continued)

(56) References Cited

U.S. PATENT DOCUMENTS

2007/0104283 A1 5/2007 Han et al.
2010/0215112 A1 8/2010 Tsai et al.
(Continued)

FOREIGN PATENT DOCUMENTS

CA 2853239 C 8/2017
CN 101783776 A 7/2010
(Continued)

OTHER PUBLICATIONS

"2D Codebook with KP structure and associated feedback," 3GPP Draft, R1-153168, Fukuoka, Japan, XP050973374, pp. 1-4, 3rd Generation Partnership Project—Valbonne, France (May 2015).

*Primary Examiner* — Vineeta S Panwalkar
(74) *Attorney, Agent, or Firm* — Leydig, Voit & Mayer, Ltd.

(57) ABSTRACT

A radio access node (RAN) and method of operation of the RAN are provided. The RAN includes a massive multiple-input-multiple-output (MIMO) antenna array. The RAN includes a processing hardware configured to carry out a communication method that includes receiving a digital data stream for transmission on a time-frequency resource. The RAN precodes the digital data stream using a digital beamforming stage to render a precoded digital downlink data stream for downlink data stream signal transmission to a user equipment. The digital beamforming stage includes a first precoding stage configured according to a long-term matrix, and a second precoding stage configured according to a short-term matrix. The RAN is further configured to generate a downlink data stream transmission signal to the
(Continued)

FIG. 3 user equipment in accordance with the precoded digital downlink data stream.

17 Claims, 5 Drawing Sheets

Related U.S. Application Data

(60) Provisional application No. 62/336,287, filed on May 13, 2016.

(52) U.S. Cl.
CPC ........... H04B 7/065 (2013.01); H04B 7/0617 (2013.01); H04L 5/0048 (2013.01)

(58) Field of Classification Search
CPC .. H04B 7/0617; H04B 7/0634; H04B 7/0452; H04B 7/0695; H04B 7/06; H04B 7/0413; H04B 7/0482; H04B 7/065; H04L 5/0023; H04L 5/0048
See application file for complete search history.

(56) References Cited

U.S. PATENT DOCUMENTS

| | | |
|---|---|---|
| 2012/0039282 A1 | 2/2012 | Kim et al. |
| 2012/0147933 A1 | 6/2012 | Li et al. |
| 2013/0089159 A1* | 4/2013 | Liu .................. H04B 7/024 375/267 |
| 2015/0092824 A1 | 4/2015 | Wicker, Jr. et al. |
| 2015/0117370 A1* | 4/2015 | Prasad, I ............. H04L 5/0035 370/329 |
| 2015/0124688 A1* | 5/2015 | Xu .................. H04B 7/0452 370/312 |
| 2015/0131750 A1 | 5/2015 | Xue et al. |
| 2016/0173176 A1* | 6/2016 | Mizusawa ........... H04B 7/0456 375/267 |
| 2018/0212665 A1 | 7/2018 | Li et al. |

FOREIGN PATENT DOCUMENTS

| | | |
|---|---|---|
| CN | 102148663 A | 8/2011 |
| CN | 103026652 A | 4/2013 |
| CN | 104025657 A | 9/2014 |
| CN | 105474556 A | 4/2016 |
| EP | 2557720 A1 | 2/2013 |
| EP | 2584727 A1 | 4/2013 |
| EP | 2985921 A1 | 2/2016 |
| WO | 2010102583 A1 | 9/2010 |
| WO | 2015109463 A1 | 7/2015 |
| WO | 2015120612 A1 | 8/2015 |
| WO | 2015131116 A1 | 9/2015 |

\* cited by examiner

PRECODING AND CHANNEL STATE INFORMATION ACQUISITION FOR MULTI-STREAM TRANSMISSIONS IN MASSIVE MIMO SYSTEMS

CROSS-REFERENCE TO RELATED APPLICATIONS

This application is a continuation of International Application No. PCT/IB2017/052863, filed on May 15, 2017, which claims priority to U.S. Provisional Application No. 62/336,287, filed on May 13, 2016. The disclosures of the aforementioned applications are hereby incorporated by reference in their entireties.

FIELD OF THE PATENT APPLICATION

Embodiments of this patent application relate generally to the field of mobile wireless communications network radio access technologies. More particularly, embodiments of the patent application are directed to adaptive precoding at a massive MIMO (multiple-input-multiple-output) radio access node (RAN).

BACKGROUND

Demand for high speed data services, especially downlink data services, fuels a need for increasing the volume of information simultaneously supported by a radio access node within a given region. Mobile wireless devices are increasingly being used to provide a variety of data streams, in the form of music and video programming, etc. Moreover, increased mobile wireless user equipment density, especially in urban environments, place additional pressures upon service providers to boost downlink data bandwidth to meet user demand for greater and greater downlink data rate limits.

New radio access technologies, providing sub-channels through spatial multiplexing of a shared frequency spectrum on a download link, are presently being developed based on massive MIMO antenna array structures comprising a plurality of individual antenna elements. Rather than radiate an omni-directional signal, groups of antenna elements of the massive MIMO antenna array structures are driven/controlled to support beamforming. Simply put, beamforming is a signal transmission technique where a same signal is transmitted (with appropriate amplitude and phase modulation) by a group of transmitters such that constructive/destructive interference results in a signal that is effectively transmitted as a beam in a particular angular direction—as opposed to radiating in all directions from a single antenna element.

Beamforming enables a single massive MIMO antenna array structure to support space-division multiple access (SDMA) simultaneous communication with multiple receivers. Such spatial multiplexing enables simultaneous downlink data streams via distinct signal beams connecting the transmitter (massive MIMO antenna structure) and receiver (e.g. user equipment). Precoding, which is paired with appropriate decoding at the receiver, is applied to the individual antenna elements to render the plurality of distinct signal beams supporting downlink data transmissions between the massive MIMO and user equipment.

Given the directional focusing of a signal arising from beamforming at the signal source (i.e. the RAN), enhanced channel status monitoring ensures that acceptable signal quality is maintained for mobile user equipment that receive downloaded information via the directional signal beams transmitted by the sub-groups of antenna elements of the massive MIMO antenna structure.

Knowledge of channel state information is an important element of successful implementation of data transmission schemes carried out by the massive MIMO antenna technologies. The "spatial" aspect of implementing SDMA multi-user schemes at the massive MIMO structures enhances the importance of maintaining an accurate and up-to-date CSI status for each of the multiple user equipment downlinks (i.e. directionally focused transmission beams) simultaneously supported by the massive MIMO implementing SDMA.

SUMMARY OF THE PATENT APPLICATION

Embodiments of the patent application provide a method, non-transitory computer readable medium, and a RAN system. The embodiments provide a highly configurable multi-stage digital precoding framework that combines long-term stability as well as short-term responsiveness according to a long-term matrix and a short-term matrix.

In order to achieve the foregoing, the embodiments adopt the following technical solutions:

According to a first aspect, an embodiment provides a radio access node (RAN) and method of operation of the RAN are described. The RAN includes a massive multiple-input-multiple-output (MIMO) antenna array. The RAN includes a processing hardware configured to carry out a communication method that includes receiving a digital data stream for transmission on a time-frequency resource. The RAN precodes the digital data stream using a digital beamforming stage to render a precoded digital downlink data stream for downlink data stream signal transmission to a user equipment. The digital beamforming stage includes a first precoding stage configured according to a long-term matrix, and a second precoding stage configured according to a short-term matrix. The RAN is further configured to generate a downlink data stream transmission signal to the user equipment in accordance with the precoded digital downlink data stream.

In a first implementation of the first aspect, the first precoding stage maps an antenna port to one or more radio frequency (RF) chains according to the long-term matrix.

In a further aspect of the first implementation, the second precoding stage maps an input data stream to one or more antenna ports according to the short-term matrix.

In yet another aspect of the first implementation, the RF chain provides an analog signal to a signal splitter, and wherein the signal splitter has a multi-line output corresponding to a sub-array of antenna elements of a massive MIMO module.

In a second implementation of the first aspect, the communication method further comprises: configuring a channel state information reference signal (CSI-RS) measurement, the configuring comprising: configuring a first-level CSI-RS measurement configuration on a long-term channel statistics information and receiving corresponding explicit channel state information (CSI) from a user equipment based on the first-level CSI-RS measurement configuration; and configuring a second-level CSI-RS measurement configuration on a short-term channel information and receiving corresponding CSI from user equipment based on the second-level CSI-RS measurement configuration.

In a further aspect of the second implementation, the explicit channel state information from the user equipment comprises a channel covariance matrix.

In a further aspect of the second implementation, the configuring the first-level CSI-RS measurement configuration is on a wideband.

In yet a further aspect of the second implementation, the configuring the second-level CSI-RS measurement configuration is on a sub-band.

According to a second aspect, a monitoring method is provided that includes receiving a digital data stream for transmission on a time-frequency resource. The method further includes precoding the digital data stream using a digital beamforming stage to render a precoded digital downlink data stream for downlink data stream signal transmission to a user equipment. The digital beamforming stage includes a first precoding stage configured according to a long-term matrix, and a second precoding stage configured according to a short-term matrix. The communication method further includes generating a downlink data stream transmission signal to the user equipment in accordance with the precoded digital downlink data stream.

In a first implementation of the second aspect, the first precoding stage maps an antenna port to one or more radio frequency (RF) chains according to the long-term matrix.

In a further aspect of the first implementation of the second aspect, the second precoding stage maps an input data stream to one or more antenna ports according to the short-term matrix.

In yet another aspect of the first implementation of the second aspect, the RF chain provides an analog signal to a signal splitter, and wherein the signal splitter has a multi-line output corresponding to a sub-array of antenna elements of a massive MIMO module.

In a second implementation of the second aspect, the communication method further comprises: configuring a channel state information reference signal (CSI-RS) measurement, the configuring comprising: configuring a first-level CSI-RS measurement configuration on a long-term channel statistics information and receiving corresponding explicit channel state information (CSI) from a user equipment based on the first-level CSI-RS measurement configuration; and configuring a second-level CSI-RS measurement configuration on a short-term channel information and receiving corresponding CSI from user equipment based on the second-level CSI-RS measurement configuration.

In a further aspect of the second implementation of the second aspect, the explicit channel state information from the user equipment comprises a channel covariance matrix.

In a further aspect of the second implementation of the second aspect, the configuring the first-level CSI-RS measurement configuration is on a wideband.

In yet a further aspect of the second implementation of the second aspect, the configuring the second-level CSI-RS measurement configuration is on a sub-band.

According to a third aspect, a non-transitory computer-readable medium is provided with computer-executable instructions that, when executed on a processing hardware, facilitate carrying out a method that includes receiving a digital data stream for transmission on a time-frequency resource. The method further includes precoding the digital data stream using a digital beamforming stage to render a precoded digital downlink data stream for downlink data stream signal transmission to a user equipment. The digital beamforming stage includes a first precoding stage configured according to a long-term matrix, and a second precoding stage configured according to a short-term matrix. The communication method further includes generating a downlink data stream transmission signal to the user equipment in accordance with the precoded digital downlink data stream.

In a first implementation of the third aspect, the first precoding stage maps an antenna port to one or more radio frequency (RF) chains according to the long-term matrix.

In a further aspect of the first implementation of the third aspect, the second precoding stage maps an input data stream to one or more antenna ports according to the short-term matrix.

In yet another aspect of the first implementation of the third aspect, the RF chain provides an analog signal to a signal splitter, and wherein the signal splitter has a multi-line output corresponding to a sub-array of antenna elements of a massive MIMO module.

In a second implementation of the third aspect, the communication method further comprises: configuring a channel state information reference signal (CSI-RS) measurement, the configuring comprising: configuring a first-level CSI-RS measurement configuration on a long-term channel statistics information and receiving corresponding explicit channel state information (CSI) from a user equipment based on the first-level CSI-RS measurement configuration; and configuring a second-level CSI-RS measurement configuration on a short-term channel information and receiving corresponding CSI from user equipment based on the second-level CSI-RS measurement configuration.

In a further aspect of the second implementation of the third aspect, the explicit channel state information from the user equipment comprises a channel covariance matrix.

In a further aspect of the second implementation of the third aspect, the configuring the first-level CSI-RS measurement configuration is on a wideband.

In yet a further aspect of the second implementation of the third aspect, the configuring the second-level CSI-RS measurement configuration is on a sub-band.

BRIEF DESCRIPTION OF THE DRAWINGS

While the appended claims set forth the features of the present patent application with particularity, the patent application and its advantages are best understood from the following detailed description taken in conjunction with the accompanying drawings, of which:

DETAILED DESCRIPTION OF THE DRAWINGS

Figure 1:
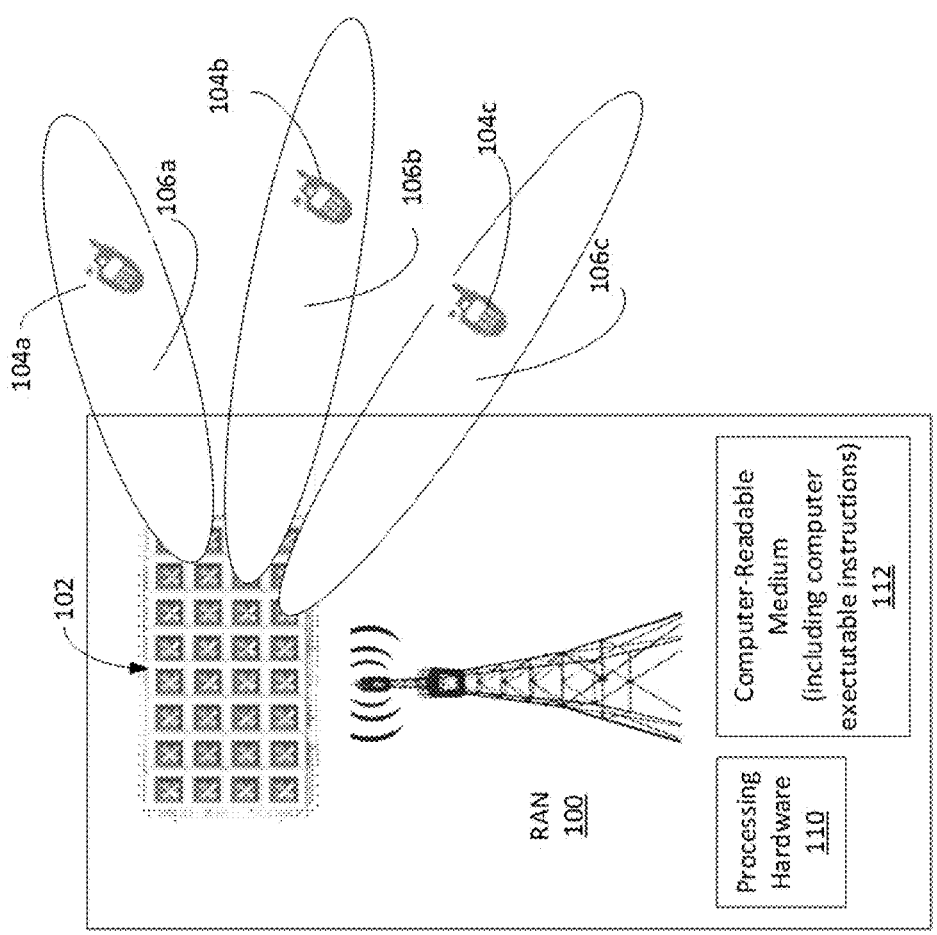
FIG. 1 is a schematic diagram illustrating radio access node including a massive MIMO simultaneously supporting, via SDMA, multiple distinct downlink transmission links to multiple user equipment devices a spatially distinct positions in relation to the massive MIMO.

Turning to FIG. 1, a schematic diagram illustratively depicts a RAN 100 comprising a massive MIMO module 102. In the illustrative example, the massive MIMO module 102, which comprises an antenna array comprising a plurality of discrete transmit/receive unit elements (antenna elements), is configured to transmit distinct beamformed signal beams 106a, 106b and 106c. In the schematic diagram, the beamformed signal beams 106a, 106b and 106c are depicted as being non-overlapping. However, in practice there may be overlap between adjacent signal beams, giving rise to a need to perform additional signal processing to cancel/reduce inter-beam signal interference. Through precoding (discussed herein below) of multiple data signal streams transmitted by the massive MIMO module 102, the RAN 100 supports simultaneous multi-steam downlink data transmissions to each of a user equipment 104a, 104b and 104c via a corresponding one or more of the signal beams 106a, 106b and 106c. Directional spacing between ones of the signal beams 106a, 106b and 106c, enables the RAN 100 to simultaneously transmit three distinct streams of downlink data over a same frequency channel.

Having described a relatively simple SDMA multi-stream downlink data arrangement with reference to FIG. 1, a wide variety of SDMA arrangements are contemplated in accordance with other exemplary systems. The number of distinct signal beams 106 will vary according to various embodiments and operational states. However, several antenna elements are needed in each group of antenna elements to transmit a single downlink data signal beam, corresponding to a particular group, confined to a relatively limited space. As a general rule, increasing the number of antenna elements in the group narrows the resulting signal beam. Thus, the number of antenna ports (S), corresponding to the groups of antennas that form the distinct signal beam, is substantially less than a total number of antenna elements (M) that make up the massive MIMO module 102. A vast variety of massive MIMO arrangements are contemplated in various illustrative examples. Thus, the above description is meant to be summary in nature—as opposed to being exhaustive— since the described elements, including massive MIMO antenna structures, are generally well known in the mobile wireless communications field.

Moreover, with continued reference to FIG. 1, the RAN 100 includes any appropriate type of a processing hardware 110 that is configured according to computer-executable instructions stored upon a computer-readable medium 112, that may be in any of a variety of quantity and form including any of a variety of non-transitory computer-readable media as will be known in the art.

Figure 2:
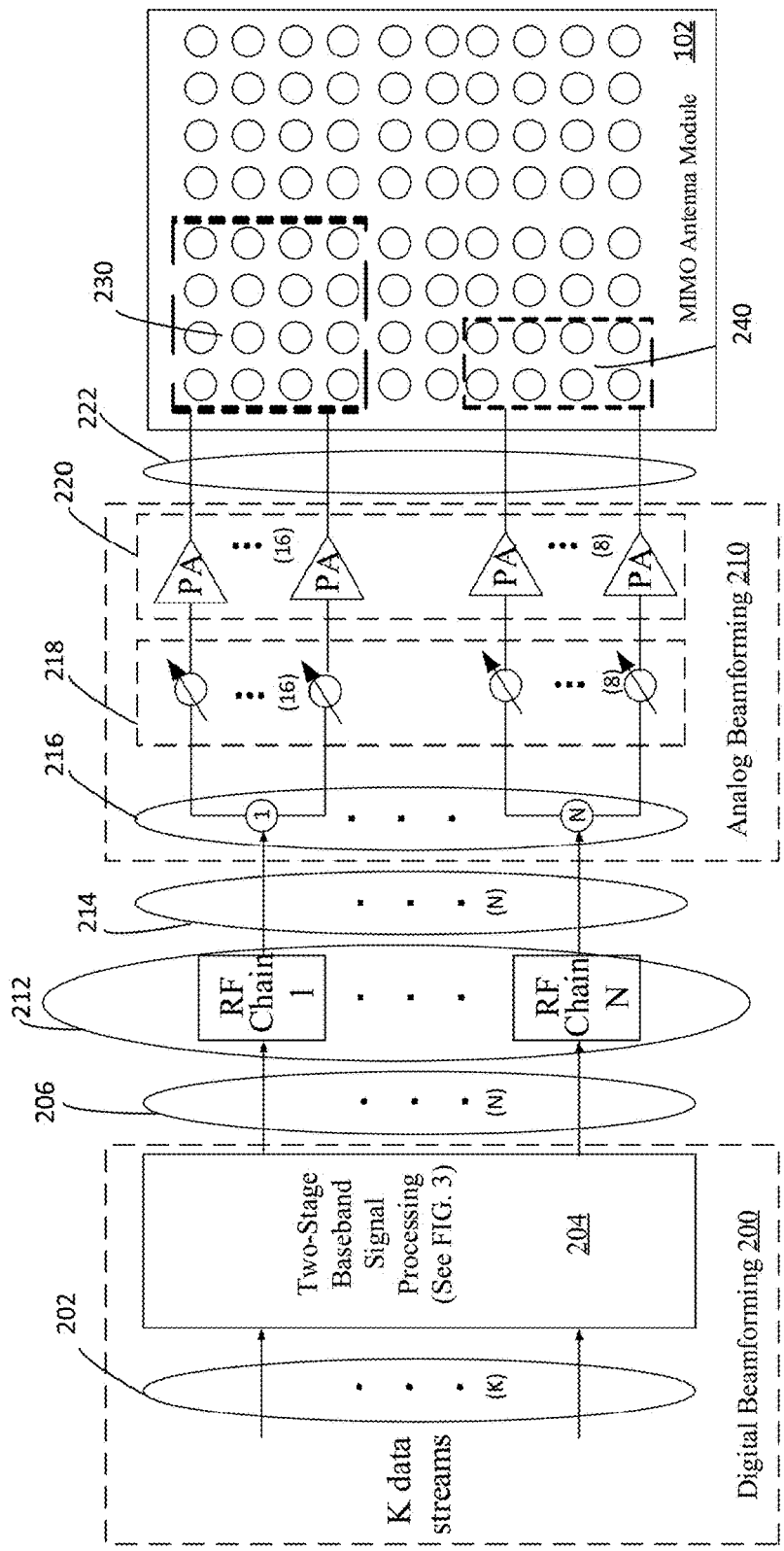
FIG. 2 is a schematic drawing of an exemplary hybrid digital-analog beamforming sub-system providing analog signals driving elements of a MIMO antenna array structure.

Having described exemplary structural/functional elements of an example of the RAN 100, reference is now made to FIG. 2 that schematically depicts an exemplary multi-stream beamforming sub-system for the RAN 100 that may be configured, in accordance with a two-stage precoding matrix, to generate one or more signal transmission beams corresponding to up to "K" distinct downlink data streams. In the illustrative example, a digital beamforming stage 200 receives the "K" distinct downlink data streams via a data stream input 202. A baseband signal processing stage 204 (described in detail below with reference to FIG. 3) performs baseband signal processing on the up to K input data streams 202 to render a digital beamforming output 206. In the illustrative example, the digital beamforming output 206 includes both data and control information driving circuitry for rendering N distinct downlink data signals corresponding to the K distinct downlink data streams 202. The number of distinct downlink data signals (N) is greater than or equal to the number of distinct downlink data streams (K) received by the two-stage baseband signal processing stage 204.

An RF chain stage 212 includes "N" distinct functional units for processing a corresponding one of the "N" distinct downlink data signals produced by the digital beamforming stage 200. The RF chain stage 212 initially transforms the N output data streams of the digital beamforming output 206 from a frequency domain into a time domain by performing a Discrete Fourier Transform (DFT) operation. Thereafter, the RF chain stage 212 functional units convert the N time domain data streams to N analog data stream signals 214.

The analog beamforming stage 210 converts the received analog data stream signals 214, corresponding to the digital beamforming output 206, into up to M distinct analog signals driving M distinct antenna elements of the massive MIMO 102. In the illustrative example, M equals 80 (i.e. a 10 by 8 array of antenna elements in the massive MIMO 102), which is a relatively small number of elements in the context of the described massive MIMO system. In some cases, the massive MIMO module 102 will have several hundred antenna elements.

With continued reference to FIG. 2, the set of analog signals 214 (N distinct signals) are each replicated by a set of configurable signal splitters 216 (N total) into "$n_x$" output analog signals, where (for x=1 to N) "$n_x$" is the number of antenna elements driven by the xth splitter output, with each of the $n_x$ outputs of the N distinct splitters driving a particular physical antenna in the massive MIMO module 102. The illustrative example depicts a partial connection arrangement. The partial connection arrangement involves connecting only a portion of the M total antenna elements of the massive MIMO module 102 to a particular one of the N analog output signals from the RF chain 212. By way of example, a first antenna sub-array 230 comprises a 4×4 array of 16 antenna elements (n=16) to transmit a first downlink data beam (corresponding to the first of the N analog output signals from the RF chain stage 212), and a second antenna sub-array 240 comprises a 4×2 array of 8 antenna elements (n=8) to transmit a second downlink data beam (corresponding to the Nth analog output from the RF chain stage 212.

Another example of an connection scheme between the N analog output signals of the RF chain stage 212 and the M elements of the massive MIMO module 102, which is not shown in FIG. 2, is a full connection arrangement where each one of the N analog output signals is split/routed to all the M antenna elements in the massive MIMO module 102.

With continued reference to FIG. 2, output analog signals from the set of configurable signal splitters 216 are provided to a set of configurable phase shifter elements 218 and a set of power amplifier elements 220. In the illustrative example, a set of M (e.g. 80) sets of phase/amplifier elements are provided to drive the individual output signals on a set of M lines 222 driving the M elements of the massive MIMO module 102. For the full connection arrangement mentioned above, which is not shown in FIG. 2, the number of total phase shifters and lines connecting the phase shifter elements and the M power amplifier elements 220 is N*M.

The illustratively depicted functional stages of the multi-stream beamforming sub-system depicted in FIG. 2 can be implemented in any of a variety of ways—including various degrees/combinations of digital and/or analog beamforming.

In a case where the massive MIMO module 102 operates at a lower carrier frequency (e.g., 4 GHz), a high spatial degree of freedom is exploited by using a dedicated RF chain behind each antenna element. This architecture is highly feasible when the number of antenna elements "M" in the massive MIMO module 102 is not prohibitively large (e.g. M=80). Using this beamforming architecture, frequency-selective beamforming may be performed in the baseband digital domain. Providing an RF chain for each of the M antenna elements, on a one-to-one basis, is referred to as full digital beamforming.

However, as the number of antenna elements "M" increases (e.g., 256 or higher), it may become uneconomical to employ the above-described one-to-one RF chain-to-antenna element architecture in terms of costs of RF chains and constraints in practical deployment of the architecture. Alternatively each RF chain is assigned to multiple antenna elements. Each RF chain drives each of the multiple antenna elements according to configured static/non-static analog weights. Thus the beamforming in this architecture combines analog beamforming and digital beamforming—referred to as "hybrid" beamforming. However, in general, is may be a better practice to have as many RF chains as possible in order to retain as much spatial multiplexing gain as possible for lower carrier frequency operation.

At a higher carrier frequency, due to particular channel characteristics such as high propagation loss, massive MIMO with even larger number of antenna elements (e.g., up to 256@30 GHz and 1024@70 GHz) can be used to compensate the channel propagation loss that would otherwise result in RAN coverage issues. Considering the implementation costs at both the massive MIMO module 102 and UE 104 sides, a hybrid array architecture and hybrid beamforming is beneficial for higher carrier frequency operating environments wherein much fewer RF chains are deployed compared with beamforming systems in a lower carrier frequency operating environment.

Various massive MIMO antenna array architectures are contemplated for different usage scenarios. However, the physical layer procedure need not be especially designed for any specific massive MIMO array architecture. For example, while a given user equipment accesses one beam, it should be transparent to the particular user equipment that beamforming at the RAN 100 is conducted in an analog/digital/hybrid way. The user equipment operates in a same manner without regard to whether full digital or hybrid beamforming is deployed at the RAN 100.

Figure 3:
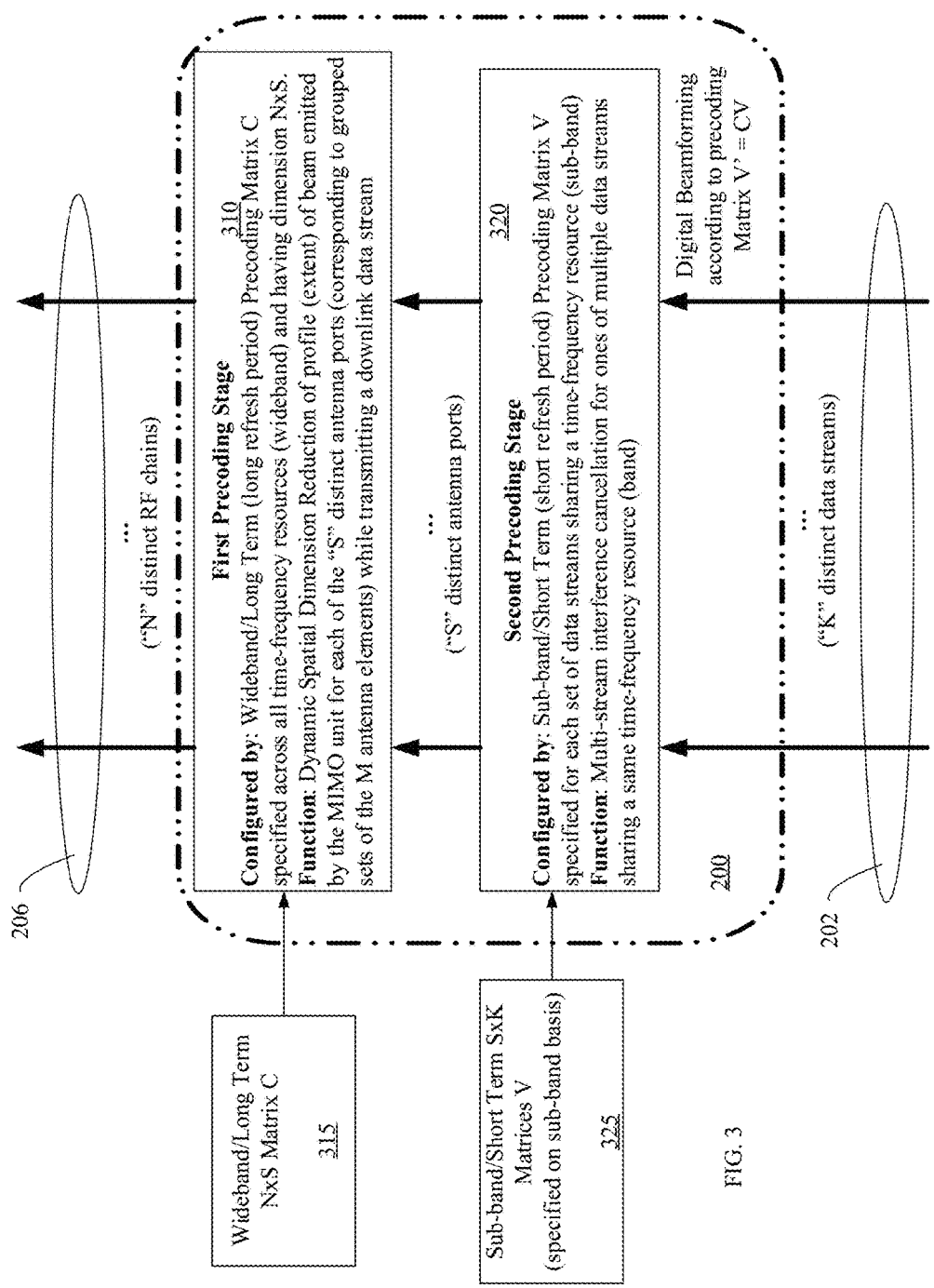
FIG. 3 is a schematic drawing of an illustrative two-stage digital beamforming component configured according to a wideband long-term precoding matrix (C) and a sub-band short-term precoding matrix (V)

Turning to FIG. 3, a two-stage precoding arrangement, of the digital beamforming stage 200 in FIG. 2, is depicted. The two-stage precoding of the K input data streams by the digital beamforming stage 200 generates the digital beamforming output 206 that drives analog signal generation circuitry for beamforming-based signal transmissions, including multi-beam transmissions, by the massive MIMO module 102. The digital beamforming stage 200 generates the digital beamforming output 206 according to a two-stage precoding arrangement configured to implement a precoding matrix (V') that is the product of a long-term precoding matrix C 315 and a set of short-term precoding matrices V 325. The long-term precoding matrix C 315 is specified across all supported frequencies (wideband). The set of short-term precoding matrices V 325 are separately specified for each of a set of supported frequency sub-bands. The two-stage precoding matrix is represented by equation (1) below in the form:

$$V'=CV \quad \text{equation (1)}$$

The long-term precoding matrix C 315, which specifies coefficients defining operation of a first precoding stage 310, defines a dynamic spatial dimension reduction (DSDR) of signal beams transmitted by the M antenna elements of the massive MIMO module 102 structure. Thus, the DSDR, defined by the long-term precoding matrix C 315, enables multi-stream downlink data transmissions via focused signal beams transmitted by the M antenna elements of the massive MIMO module 102 driven according to the digital beamforming output 206 of the digital beamforming stage 200.

In an illustrative example, the long-term precoding matrix C 315 is an N×S wideband long-term precoding matrix component that configures operation of the first precoding stage 310 having S distinct antenna port inputs and N distinct RF chain outputs. The set of S inputs correspond to "antenna ports". In the illustrative embodiment, each of the S antenna ports is exclusively matched with at least one of the N distinct RF chain outputs of the first precoding stage 310. Thus, the number antenna ports "S" may not exceed the number of distinct RF chain outputs "N". Thus, the long-term precoding matrix C 315, in defining relationships between the S distinct input antenna ports and the N distinct outputs of the digital beamforming output 206, roughly defines occupation, by signals corresponding to the S antenna ports, of a total beam space occupied by antenna transmissions from the massive MIMO module 102 driven by the N distinct outputs of the digital beamforming output 206. As such, the coefficients of the long-term precoding matrix C are dynamically adjusted, by way of example, in accordance with actual and/or contemplated positions of user equipment that receive downlink data via the massive MIMO module 102.

The particular values assigned to the elements of the long-term precoding matrix are determined by relatively long-term specifications for general beam quality and coverage arising from user equipment usage patterns with regard to the RAN 100 as well as neighboring RANs. The long-term temporal aspect of the long-term precoding matrix C 315 is a relative term (in comparison to contents of the set of short-term precoding matrices V 325). As such, the refresh/stability of the values specified in the long-term precoding matrix may be hundreds of milliseconds, several seconds or minutes, etc.

In the illustrative example, the long-term precoding matrix C 315 is an N×S wideband and long-term precoding matrix. The contents of the long-term precoding matrix C 315 configure operation of the first precoding stage 310 having an effect of reducing the spatial dimension from N to S. S may be equal to N (i.e. each one of the S distinct antenna ports is paired exclusively with one of the N distinct RF chains). In all cases S is not greater than N. The values of the coefficients making up the precoding matrix C 315 may be obtained by calculations based upon various criteria, where the criteria are based on long-term and wideband channel information of all user equipment attached to the RAN 100 over a period of time. For example, the criteria may include: a maximum channel capacity criterion, a minimization criterion of mean-square error, a minimum singular value criterion, etc. In a case where there is no analog beamforming (i.e., no analog signal splitting per splitters depicted in FIG. 2), N is equal to M.

By way of a particular example, the long-term precoding matrix C 315 is obtained from a spatial channel covariance matrix of each user equipment. $R_k$ denotes a channel correlation matrix of a particular user k (corresponding to one or more downlink data streams of the K distinct streams). The weighted matrix of all the channel covariance matrices (R hat) is computed according to equation (2):

$$\hat{R} = \sum_k R_k / \|R_k\| \quad \text{equation (2)}$$

As R hat is a Hermitian matrix, one may obtain the following equation (3) by Eigen value decomposition:

$$\hat{R}=U\Lambda U^H \quad \text{equation (3)}$$

Using the maximum capacity criterion (from the above-listed examples of illustrative criteria), the long-term precoding matrix C 315 comprises S columns of matrix U corresponding to maximum S Eigen values in accordance with equation 4:

$$C=U(:,1:S) \quad \text{equation (4)}$$

With continued reference to FIG. 3, the set of short-term precoding matrices V 325 specify coefficients on a sub-band basis that define operation of a second precoding stage 320. The second precoding stage 320, maps each of the K data streams to one or more of the S distinct antenna ports according to a configuration defined by the contents of one of the set of short-term precoding matrices 325. As such, the second precoding stage 320 carries out a mapping, under a configuration provided by one of the short-term precoding matrices V 325, that facilitates multi-stream interference cancellation between the K distinct data streams, of the data stream input 202, simultaneously supported by the RAN 100.

Structurally, each one of the set of short-term precoding matrices V 325 is an S×K sub-band (specified on a sub band basis) and short-term precoding matrix for addressing/canceling multi-stream interference. S, as noted above, is the number of distinct antenna ports input to the first precoding stage 310. K is the number of distinct data streams from one or multiple user equipment transmitted on the same time-frequency resources (sub-band). The K data streams are mapped into S antenna ports by short-term precoding matrix V. In all cases K is not greater than S (the number of antenna ports—and thus the number of distinct beams—supported by the currently defined long-term precoding matrix C).

The massive MIMO module 102 supports single user (SU) and multi-user (MU) MIMO operation. Thus, by way of example, the short-term precoding matrix V for a particular sub-band is obtained according to any of a number of known precoding algorithms of SU-MIMO or MU-MIMO based on a measurement of sub-band and short-term effective channel HC in a lower dimension, where H is a channel matrix.

By way of example, the precoding matrix V can be obtained according to a zero forcing (ZF) precoding algorithm below:)

$$V=\tilde{H}^H(\tilde{H}\tilde{H}^H)^{-1} \quad \text{equation (5)}$$

$\tilde{H}=HC$ is the effective channel after the first stage precoding.

The two-stage precoding arrangement described herein above with reference to FIG. 3, which includes the long-term precoding matrix C 315 and the set of short-term precoding matrices V 325 comprising coefficients configured according to any of a variety of CSI-based feedback provided by user equipment, ensures responsiveness by the RAN 100 to transient conditions as well as relatively long-term predictability/stability of areal coverage by particular ones of the S antenna ports supporting the multi-streaming data downlink data transmission functionality of the RAN 100 having the massive MIMO module 102.

Figure 4:
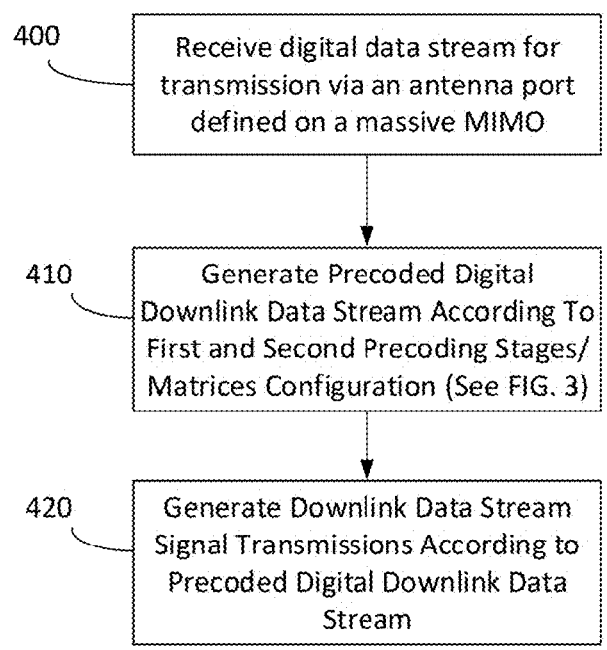
FIG. 4 is a flowchart summarizing operations performed by a RAN to generate a precoded downlink data stream signal to a MIMO using a two-stage digital beamforming component depicted in FIG. 3.

Referring to FIG. 4, a flowchart summarizes a set of steps for a method carried out in the RAN 100 to provide a beamformed downlink data signal corresponding to one of multiple simultaneously supported K downlink data streams in a precoded multi-streaming downlink data transmission environment supported by the massive MIMO module 102. During 400, the RAN 100 receives a first digital data stream for transmission via an antenna port defined on the massive MIMO module 102. During 410, the RAN 100 processes the first digital data stream using the digital beamforming 300 comprising the first precoding stage and the second precoding stage to render a precoded digital downlink data stream corresponding to an antenna port defined on the massive MIMO module 102 for downlink data stream signal transmissions to a user equipment within a dynamic spatial dimension reduction space of an RF beam defined by the first precoding stage on a long-term basis and by the second precoding stage on a short-term basis to carry out interference cancellation. During 420, the RAN 100 generates the downlink data stream signal transmissions to the user equipment in accordance with the precoded digital downlink data stream.

Having described a two-stage precoding scheme implemented in the RAN 100, a CSI acquisition framework is describe for supporting operation of the massive MIMO module 102 operating in an SDMA downlink data transmission mode. The CSI acquisition framework includes: schemes on transmission mode and CSI-acquisition, a precoding scheme for data transmission, a CSI reference signal (CSI-RS) for channel measurement, an interference measurement, a beamforming type and a CSI feedback.

In particular, a complimentary CSI acquisition framework is described for providing appropriate signal quality feedback, from user equipment to the RAN 100 operating to send a downlink data signal beam to user equipment via the massive MIMO module 102. The CSI acquisition framework supports the short-term responsiveness and long-term stability aspects of the precoding arrangement discussed herein above with reference to FIG. 3. The precoding arrangement and complimentary CSI acquisition framework, in combination, provide a superior multi-stream downlink data transmission framework supporting high data transmission rates from a RAN, such as the RAN 100, in a mobile wireless data communication environment.

By way of example, the CSI acquisition framework acquires measurements from multiple resources. First, CSI information is acquired in the form of a Channel Measure. By way of example, channel measurements are obtained using a CSI-RS that is configured at two levels in accordance with the distinct stages of the above-described two-stage precoding scheme for configuring a downlink data channel. Thus, a two-level CSI-RS configuration is performed—with each level corresponding to one of the first precoding stage 310 and the second precoding stage 320 of the digital beamforming stage 200.

In accordance with first-level (long-term) CSI-RS configuration and CSI reporting, the RAN 100 configures a CSI-RS measurement on wideband and long-term channel statistics information. In response to the CSI-RS based on the first-level CSI-RS measurement configuration, the user equipment 104 estimates and reports a corresponding explicit CSI (e.g., a channel covariance matrix).

In accordance with second-level (short-term) CSI-RS configuration and CSI reporting, the RAN 100 configures a CSI-RS measurement on a sub-band/short-term instantaneous channel with a reduced dimension based on the DSDR (defined by the long-term precoding matrix C 315). In response to the CSI-RS based on the second-level CSI-RS measurement configuration, the user equipment 104 estimates and reports the corresponding CSI, either in implicit or explicit feedback.

Regarding the proposed two-stage precoding scheme summarized in FIG. 3, a hybrid CSI-RS configuration maybe implemented, for sub-6 GHz operation of the massive MIMO module 102, by utilizing non-precoded CSI-RS for the first-level (long-term) CSI-RS configuration and beamformed CSI-RS for the second-level (short-term) CSI-RS configuration. For above 6 GHz, due to link budget issues which become progressively worse as frequency increases, beamformed CSI-RS may be exclusively used to mitigate a significant path loss for beam training/tracking.

Second, CSI information is acquired in the form of an Interference Measurement. Interference measurement is crucial to scheduling and link adaptation quality, and thus is included in the CSI acquisition framework. For the massive MIMO module 102, a MU-MIMO mode of operation is suitable for a wide range of usage/scenarios. As a result, inter-user equipment interference measurements can directly impact channel state information accuracy. Therefore, enhanced interference measurement schemes, which consider inter-user equipment interference, are implemented in exemplary CSI acquisition schemes.

Another aspect of the CSI acquisition framework comprises CSI reporting by the user equipment 104 to the RAN 100. Reporting can be in a form of either explicit or implicit feedback provided by the user equipment to the RAN 100. Explicit feedback is CSI reporting as observed by the user equipment 104 without assuming any transmission or reception strategies. Implicit feedback, in contrast, involves the user equipment (reporter of CSI feedback) rendering a hypotheses of transmission and/or reception strategies at the time of generating the CSI feedback. Explicit feedback includes direct channel feedback, compressed channel feedback, channel Eigen-vector feedback, or covariance matrix feedback. Without the restriction of SU-MIMO in implicit feedback, full channel information can be accurately obtained at the RAN 100 with explicit feedback, which is beneficial for enhancing/optimizing MU-MIMO performance.

Yet another aspect of the CSI acquisition framework comprises a feedback mechanism. Two feedback mechanisms are: a channel reciprocity method (e.g. uplink sounding), and a downlink reference signal measurement based method (e.g. quantized feedback and analog feedback). Reciprocity is likely a less desirable feedback mechanism by user equipment to the RAN. The downlink reference signal measurement based mechanism is carried out by initially conducting a channel measurement at the user equipment 104 side from a set of downlink reference signals and then feedback the channel information on an uplink physical channel. The downlink feedback mechanism may comprise providing either one or both of quantized feedback and non-quantized feedback. Quantized feedback, which is also known as codebook based feedback, is generally robust to low SINR. However, MIMO performance of codebook based feedback is very sensitive to quantization accuracy. Improved feedback accuracy also means a larger codebook to design, more uplink feedback bits and larger UE CQI/PMI/PI derivation complexity.

It is contemplated that, in various implementations of the RAN 100 communicating via a plurality of simultaneous downlink data streams, a robust codebook structure is used based on the combination of multiple beams. Such codebook may comprise adaptations for various antenna port configurations on the massive MIMO module 102 and resulting channel properties.

Analog feedback is unquantized and uncoded. In such cases, the user equipment 104 estimates a downlink channel based on the downlink CSI-RS and then modulates the downlink CSI (e.g. Eigen vector) onto certain sequences. The RAN 100 detects the sequences and obtains the downlink CSI.

In addition, the aforementioned combination of multiple beams can map the channel information (e.g. Eigen vectors) into a weighted-sum of multiple basic beams, which contains a few best beams. In this case, the weights for the selected beams include amplitudes and phases, which are a kind of analog content of CSI and can be directly fed back to the RAN 100 in an analog way.

Still another aspect of an exemplary CSI acquisition framework is the feedback channel design. The reliable and efficient transmission of CSI information becomes critically important as the number of antenna elements M increases in the massive MIMO, as the number of distinct simultaneously supported user equipment increases, and as the available bandwidth resources increases. To facilitate high resolution CSI feedback for the massive MIMO module 102 of the RAN 100 system, a dedicated uplink feedback channel is supported, which features flexible configurations of coding and modulation, large antenna array reception, and non-orthogonal training, among other things.

Figure 5:
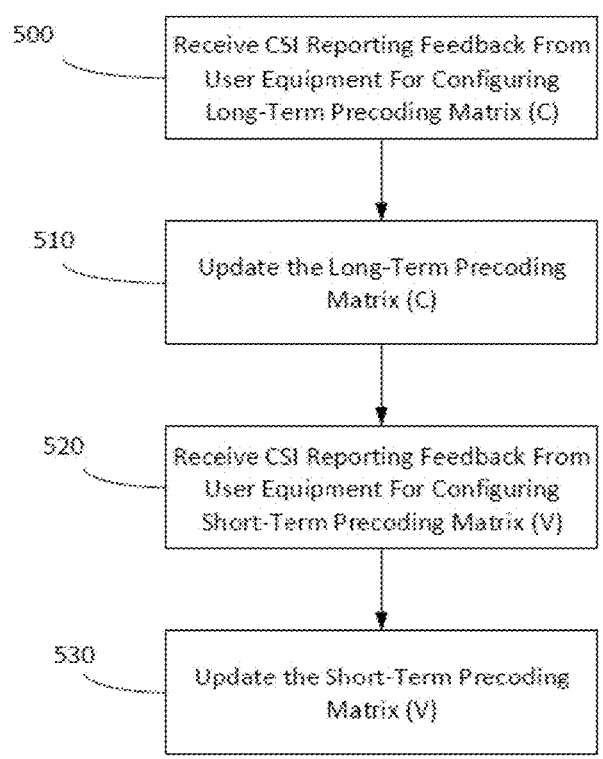
FIG. 5 is a flowchart summarizing configuration of the two-stage digital beamforming component depicted in FIG. 3.

Referring to FIG. 5, a flowchart summarizes a set of steps for a method carried out in the RAN 100 to configure the long-term precoding matrix (C) and the short-term precoding matrix (V) for rendering the precoding matrix (V') for the RAN 100 including the massive MIMO module 102. During 500, the RAN 100 receives explicit CSI reporting feedback from the user equipment 104 for configuring coefficients of the long-term precoding matrix C 315 in accordance with the CSI acquisition framework described above. During 510, the RAN 100 updates the long-term precoding matrix C 315 in accordance with the explicit CSI reporting feedback received during 500. During 520, the RAN 100 receives either one or both implicit and/or explicit CSI reporting feedback from the user equipment 104 for configuring coefficients of a particular one of the multiple sub-bands corresponding to one of the set of short-term precoding matrices V 325 in accordance with the CSI acquisition framework described above. During 530, the RAN 100 updates the one of the set of short-term precoding matrices V 325 in accordance with the CSI reporting feedback received during 520.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the patent application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the patent application and does not pose a limitation on the scope of the patent application unless otherwise claimed. No language in the specification should be construed as indicating any non-claimed element as essential to the practice of the patent application.

Exemplary embodiments are described herein known to the inventors for carrying out the patent application. Variations of these embodiments may become apparent to those of ordinary skill in the art upon reading the foregoing description. The inventors expect skilled artisans to employ such variations as appropriate, and the inventors intend for the patent application to be practiced otherwise than as specifically described herein. Accordingly, this patent application includes all modifications and equivalents of the subject matter recited in the claims appended hereto as permitted by applicable law. Moreover, any combination of the above-described elements in all possible variations thereof is encompassed by the patent application unless otherwise indicated herein or otherwise clearly contradicted by context.

What is claimed is:

1. A communication method comprising:
   receiving a digital data stream for transmission on a time-frequency resource;
   precoding the digital data stream using a digital beamforming stage to render a precoded digital downlink data stream for downlink data stream signal transmission to a user equipment, the digital beamforming stage comprising:
      a first precoding stage configured according to a long-term matrix, wherein the first precoding stage maps an antenna port to one or more radio frequency (RF) chains according to the long-term matrix, and
      a second precoding stage configured according to a short-term matrix; and
   generating a downlink data stream transmission signal to the user equipment in accordance with the precoded digital downlink data stream.

2. The method of claim 1, wherein the second precoding stage maps an input data stream to one or more antenna ports according to the short-term matrix.

3. The method of claim 1, wherein the RF chain provides an analog signal to a signal splitter, and wherein the signal splitter has a multi-line output corresponding to a sub-array of antenna elements of a massive multiple-input-multiple-output (MIMO) module.

4. The method of claim 1, further comprising:
   configuring a channel state information reference signal (CSI-RS) measurement, the configuring comprising:
      configuring a first-level CSI-RS measurement configuration on long-term channel statistics information and receiving corresponding explicit channel state information (CSI) from a user equipment based on the first-level CSI-RS measurement configuration; and
      configuring a second-level CSI-RS measurement configuration on short-term channel information and receiving corresponding CSI from a user equipment based on the second-level CSI-RS measurement configuration.

5. The method of claim 4, wherein the explicit channel state information from the user equipment comprises a channel covariance matrix.

6. The method of claim 4, wherein the configuring the first-level CSI-RS measurement configuration is on a wideband.

7. The method of claim 4, wherein the configuring the second-level CSI-RS measurement configuration is on a sub-band.

8. A radio access node (RAN) comprising:
   a massive multiple-input-multiple-output (MIMO) antenna array;
   a hardware processor; and
   a non-transitory computer readable medium including computer-executable instructions, that when executed by the hardware processor, carry out a communication method comprising:
   receiving a digital data stream for transmission on a time-frequency resource;
   precoding the digital data stream using a digital beamforming stage to render a precoded digital downlink data stream for downlink data stream signal transmission to a user equipment, the digital beamforming stage comprising:
      a first precoding stage configured according to a long-term matrix, wherein the first precoding stage maps an antenna port to one or more radio frequency (RF) chains according to the long-term matrix, and
      a second precoding stage configured according to a short-term matrix; and
   generating a downlink data stream transmission signal to the user equipment in accordance with the precoded digital downlink data stream.

9. The RAN of claim 8, wherein the second precoding stage maps an input data stream to one or more antenna ports according to the short-term matrix.

10. The RAN of claim 8, wherein the RF chain provides an analog signal to a signal splitter, and wherein the signal splitter has a multi-line output corresponding to a sub-array of antenna elements of a massive MIMO module.

11. The RAN of claim 8, wherein the communication method further comprises:
   configuring a channel state information reference signal (CSI-RS) measurement, the configuring comprising:
      configuring a first-level CSI-RS measurement configuration on long-term channel statistics information and receiving corresponding explicit channel state information (CSI) from a user equipment based on the first-level CSI-RS measurement configuration; and
      configuring a second-level CSI-RS measurement configuration on short-term channel information and receiving corresponding CSI from a user equipment based on the second-level CSI-RS measurement configuration.

12. The RAN of claim 11, wherein the explicit channel state information from the user equipment comprises a channel covariance matrix.

13. The RAN of claim 11, wherein the configuring the first-level CSI-RS measurement configuration is on a wideband.

14. The RAN of claim 13, wherein the configuring the second-level CSI-RS measurement configuration is on a sub-band.

15. A non-transitory computer-readable medium including computer-executable instructions, which when executed by a processor of a radio access node (RAN), cause the RAN to implement a communication method comprising:
   receiving a digital data stream for transmission on a time-frequency resource;
   precoding the digital data stream using a digital beamforming stage to render a precoded digital downlink data stream for downlink data stream signal transmission to a user equipment, the digital beamforming stage comprising:
  a first precoding stage configured according to a long-term matrix, wherein the first precoding stage maps an antenna port to one or more radio frequency (RF) chains according to the long-term matrix, and
  second precoding stage configured according to a short-term matrix; and
generating a downlink data stream transmission signal to the user equipment in accordance with the precoded digital downlink data stream.

16. The non-transitory computer-readable medium of claim 15, wherein the second precoding stage maps an input data stream to the antenna port according to the short-term matrix.

17. The non-transitory computer-readable medium of claim 15, wherein the RF chain provides an analog signal to a signal splitter, and wherein the signal splitter has a multi-line output corresponding to a sub-array of antenna elements of a massive multiple-input-multiple-output (MIMO) module.

* * * * *

UNITED STATES PATENT AND TRADEMARK OFFICE
CERTIFICATE OF CORRECTION

PATENT NO. : 10,516,462 B2  
APPLICATION NO. : 16/188791  
DATED : December 24, 2019  
INVENTOR(S) : Wu et al.

Page 1 of 1

It is certified that error appears in the above-identified patent and that said Letters Patent is hereby corrected as shown below:

On the Title Page

Item (63) Related U.S. Application Data:  
"Continuation of application PCT/IB2017/052863."  
Should read:  
-- Continuation of application PCT/IB2017/052863, filed on May 15, 2017. --.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*